(12) United States Patent
Jabbarnezhad

(10) Patent No.: US 6,343,064 B1
(45) Date of Patent: Jan. 29, 2002

(54) METHOD AND SYSTEM FOR REMOTE MANAGEMENT OF EQUIPMENT HAVING DUPLICATE NETWORK ADDRESSES

(75) Inventor: Javid Jabbarnezhad, Parker, TX (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 09/129,585

(22) Filed: Aug. 4, 1998

(51) Int. Cl.[7] .................. H04J 1/16; H04J 3/14
(52) U.S. Cl. ............... 370/216; 370/228; 370/241; 370/245; 370/244
(58) Field of Search ................. 370/389, 392, 370/395–402, 409, 410, 475, 254, 216, 217, 221, 225, 227, 228, 241, 242–245, 252–253; 709/200, 201, 203, 202, 217, 218, 219, 223, 224, 225, 226

(56) References Cited

U.S. PATENT DOCUMENTS

| 5,229,988 A | * | 7/1993 | Marbaker | 370/352 |
| 5,708,654 A | * | 1/1998 | Arndt et al. | 370/242 |
| 5,724,510 A | * | 3/1998 | Arndt et al. | 395/200.5 |
| 6,158,011 A | * | 12/2000 | Chen et al. | 713/201 |

* cited by examiner

*Primary Examiner*—Ajit Patel
(74) *Attorney, Agent, or Firm*—Baker Botts LLP

(57) ABSTRACT

A communications system for remotely managing equipment includes a first remote device and a second remote device having the same network address. A communications network includes a first link connecting the first remote device to a management station and a second, disparate link connecting the second remote device to the management station. The management station is operable to individually access the first remote device via the first link and to individually access the second remote device via the second link.

18 Claims, 3 Drawing Sheets

METHOD AND SYSTEM FOR REMOTE MANAGEMENT OF EQUIPMENT HAVING DUPLICATE NETWORK ADDRESSES

RELATED APPLICATIONS

This application is related to copending U.S. patent application Ser. No. 09/129,199, entitled "METHOD AND SYSTEM FOR AUTOMATIC LINE PROTECTION SWITCHING OF EMBEDDED CHANNELS," filed Aug. 4, 1998 and U.S. patent application Ser. No. 09/129,201, entitled "SYSTEM AND METHOD FOR EMULATING A DISTRIBUTED NETWORK," filed Aug. 4, 1998.

TECHNICAL FIELD OF THE INVENTION

This invention relates generally to communications systems, and more particularly to a method and system for remote management of equipment having duplicate network addresses.

BACKGROUND OF THE INVENTION

With the move toward decentralized processing, users have interconnected workstations, computers and other types of local equipment through local area networks (LANs). More recently, as users move toward global communications that allow equipment to appear as if it were attached to the local area network, local area networks have been interconnected through wide area networks (WANs).

Due to the success of the Internet, the Internet Protocol (IP) has become the primary networking protocol. To make routing efficient, the Internet Protocol uses addresses that include a network portion and a host portion. Internet Protocol addresses are assigned to the interconnection of a host to a physical network.

Independent assignment by each user of Internet Protocol addresses to its own equipment has lead to duplication of Internet Protocol addresses between users. As a result, while a user may access its equipment over an intranet or other closed network using an independently assigned Internet Protocol address, the user cannot rely on that Internet Protocol address to access the equipment over the Internet or other open network. For this reason, a service provider cannot provide remote services for globally distributed equipment belonging to various users.

SUMMARY OF THE INVENTION

In accordance with the present invention, a remote management method and system are provided that substantially eliminate or reduce disadvantages or problems associated with previously developed systems and methods. In particular, the present invention provides a remote management system and method that individually accesses equipment having duplicate network addresses.

In accordance with one embodiment of the present invention, a communications system for remotely managing equipment includes a first remote device and a second remote device having the same network address. A communications network includes a first link connecting the first remote device to a management station and a second, disparate link connecting the second remote device to the management station. The management station is operable to individually access the first remote device via the first link and to individually access the second remote device via the second link.

More specifically, in accordance with a particular embodiment of the present invention, the network address is an Internet Protocol (IP) address. The communications network is a frame relay network, and the first and second links are each an embedded channel, such as a private virtual channel (PVC) of a network trunk.

Technical advantages of the present invention include providing a remote management system for equipment having duplicate network addresses. In particular, remote devices are separately linked through an open network to a management station. This is accomplished by linking each remote device to a separate input of a switch. The management station is operable to access the remote devices based on addresses associated with the switch inputs. In this way, service providers may remotely access and service equipment over an open network without the cost of maintaining the network addresses as unique.

Other technical advantages of the present invention will be readily apparent to one skilled in the art from the following figures, descriptions, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
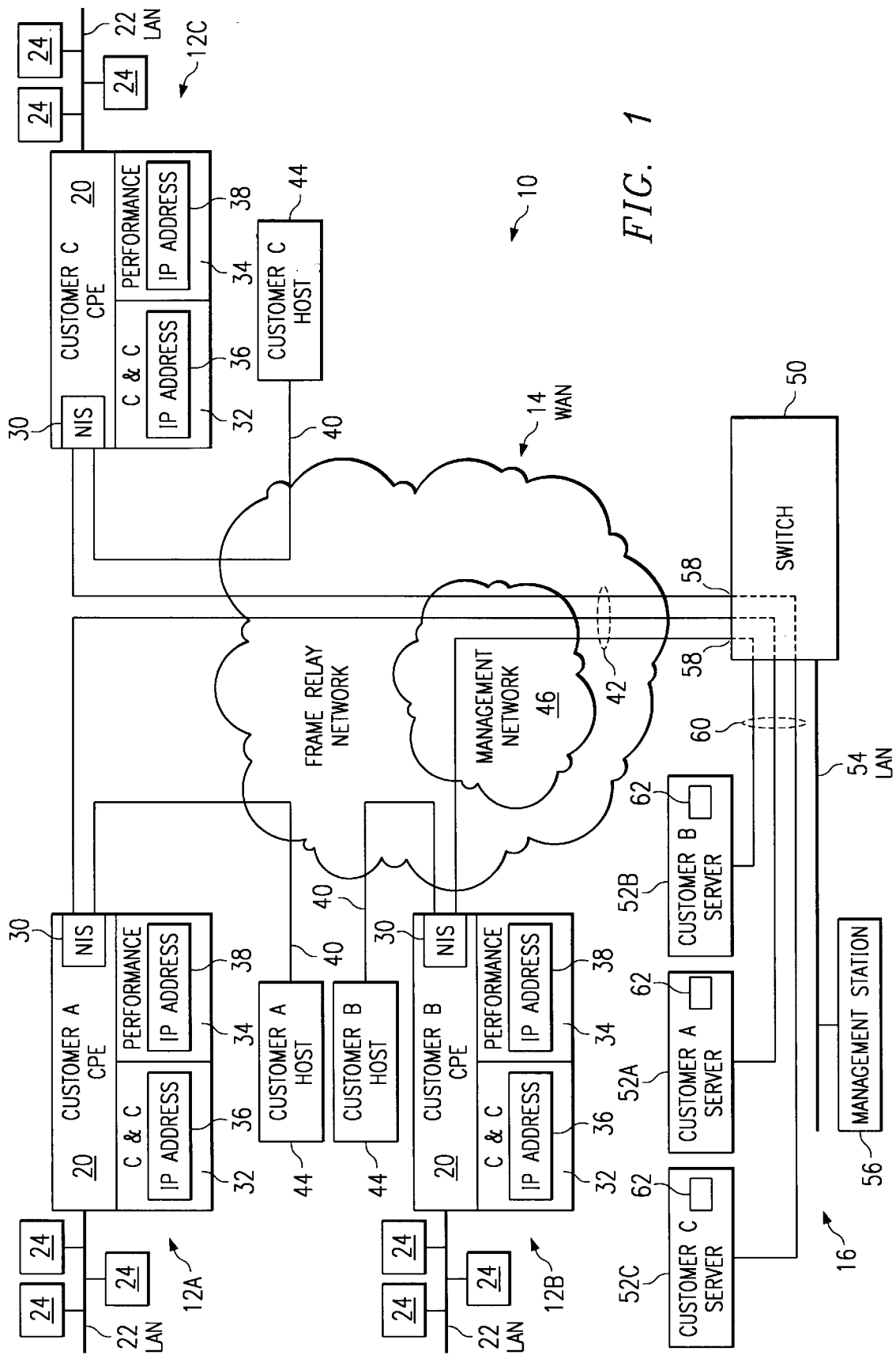
FIG. 1 is a schematic block diagram illustrating a communications system for remote management of customer premise equipment in accordance with one embodiment of the present invention.

FIG. 1 illustrates a communications system 10 for remote management of customer equipment in accordance with one embodiment of the present invention. The communications system 10 includes a plurality of customer sites 12A, 12B and 12C connected through a communications network to a management site 16. The customer site 14 may be globally distributed and thus remote from each other and the management site 16.

Referring to FIG. 1, each of customer site 12 includes an item of customer premise equipment (CPE) 20, a local area network (LAN) 22, and a local network equipment 24. The customer premise equipment 20 may be a telephony switch, other telephony equipment, or other type of equipment that is remotely distributed and operated.

The customer premise equipment 20 includes a network interface system (NIS) 30, a command and control (C&C) system 32, and a performance (Perf.) system 34. The network interface system 30 connects the customer premise equipment 20 to the communications network 14. For the embodiment of FIG. 1 in which the communications network is a frame relay network, the network interface system is a frame relay with router (FRAD). The frame relay with router encapsulates and decapsulates messages and data transmitted and received over the communications network 14.

The command and control system 32 includes software that manages the operation of the customer premise equipment 20 and the local network equipment 24 through the customer premise equipment 20. The command and control system 32 includes a network address 36 with which the command and control system 32 can be accessed. In one embodiment, the network address 36 is an Internet Protocol (IP) address. The Internet Protocol address is a 32-bit address that includes a network portion and a host portion for efficient routing.

The performance system 34 includes software and memory for monitoring, recording, and storing performance data for the customer premise equipment 20 and the local network equipment 24 through the customer premise equipment 20. The performance system 34 includes a network address 38 with which the performance system 34 can be accessed. In one embodiment, the network address 38 is an Internet Protocol address.

Because the Internet Protocol addresses of the command and control systems 32 and the performance systems 34 are independently assigned by each customer, the Internet Protocol addresses may be duplicated between the customer premise equipment 20. For example, the command and control system 32 of customer A's premise equipment 20 may have the same Internet Protocol address as the command and control system 32 for customer B's premise equipment 20. Similarly, the performance system 34 for customer C's premise equipment 20 may have that same Internet Protocol address. As described in more detail below, the present invention allows such systems and equipment having duplicate Internet Protocol addresses to be individually accessed and remotely managed over an open network. An open network is a public network or other network in which network addresses may be duplicated.

The local area network 22 of each customer site 12 is connected to a network port of the customer premise equipment 20 of that site. The local area network 22 may be an Ethernet or other suitable type of local network. The local equipment 24 connected to the local area network 22 may be servers, databases, or other suitable devices accessed by the customer premise equipment 20.

The communications network 14 is a wide area network (WAN) that connects the customer sites 12 to the management site 16. For the embodiment of FIG. 1, the communications network 14 is a frame relay network. The frame relay network uses a packet-switching protocol for connections between remote locations. The packets are in the form of frames which are variable in length. An advantage to the frame relay network is that data packets of various sizes associated with virtually any native data protocol can be accommodated. As a result, the frame relay network is protocol independent because it does not undertake a lengthy protocol conversion process and offers fast and less expensive switching and/or routing. The frame relay network may include the series of hubs, switches, bridges, and routers for transmitting traffic between the customer sites 12 and the management site 16.

The frame relay network includes operational links 40 and management links 42 for the customer premise equipment 20 of each client site 12. The operational link 40 connects the customer premise equipment 20 to a remote host 44 which provides database and other operating information for the customer premise equipment 20. The remote host 44 may be a server or other suitable device.

The management links 42 form a robust management network 46 within the communications network 14. In one embodiment, as described in more detail below, each management link 42 includes an embedded channel defined in a network trunk. The network trunk may be a T1 and the embedded channel may be a private virtual channel (PVC).

For the embodiment of FIG. 1, a separate management link 42 connects the customer premise equipment 20 of each site 12 to the management site 16. It will be understood that a single management link 42 may be used to connect a plurality of items of customer premise equipment 20 from the same or different sites 20 to the management site 16 as long as the Internet Protocol addresses connected through link 42 are unique. Thus, for example, if a customer assigns its premise equipment 20 Internet Protocol addresses that are internally unique, then a single management link 42 may be used to connect that customer's equipment to the management site 16. Similarly, if divisions or segments of the customer's equipment or groups of customers have Internet Protocol addresses that are unique among themselves, the customer premise equipment 20 for those divisions, segments, or groups may be connected to the management site 16 through a single management link 42.

The management site 16 includes a switch 50, a plurality of customer servers 52A, 52B, and 52C, a local area network 54, and a management station 56. The switch 50 includes a separate input 58 for each management link 42. The switch 50 routes traffic based on the input 58 or link 42 from which the traffic is received. Thus, traffic received from the customer premise equipment 20 of customer site 12A is routed through the switch 50 to the customer server 52A. Similarly, traffic received from the customer premise equipment 20 of customer site 12B is routed through the switch 50 to the customer server 52B and traffic received from the customer premise equipment 20 of customer site 12C is routed through the switch 50 to the customer server 52C. The switch 50 may be a digital cross connect switch, a router with static routing, or other device operable to direct traffic based upon the input or line from which the traffic was received.

For the embodiment of FIG. 1, the switch 50 is connected to the servers 52 via multiple ports 60. This allows traffic to be directed from a management link 42 to a server 52 without additional addressing by the switch 50. Alternatively, the switch 50 may be connected to the servers 52 via the local area network 54. In this embodiment, the switch 50 addresses traffic to the servers 52 on the local area network 54 based on the input 58 or link 42 on which the traffic was received.

The customer servers 52 each include a memory 62 for storing downloaded traffic. In one embodiment, performance data for the customer premise equipment 20 of a customer site 12 may be automatically downloaded and stored in the memory 62 of the customer server 52 at scheduled intervals. In this embodiment, for example, the performance data may be downloaded every 24 hours. Additionally, the performance data may be downloaded upon request from the management station 56.

The management station 56 is a work station or other suitable device operable to access and manage the client sites 12. The management station 56 is connected to this switch via the local area network 54. The local area network 54 may be an Ethernet or other suitable local network.

The management station 56 uses addresses associated with the switch inputs 58 to distinguish and thus individually access the customer premise equipment 20 of the customer sites 12. An address is associated with an input 58 when it is, in whole or in part, the address of the input 58, is based upon the input address, or capable of being traced back to or related to the input 58. Using addresses associated with the switch inputs 58, the management station 56 is able to indirectly access customer premise equipment having a same Internet Protocol address. Accordingly, customer sites 12 can be managed without the time consuming and costly task of maintaining unique Internet Protocol addresses for each item of customer premise equipment 20.

Figure 2:
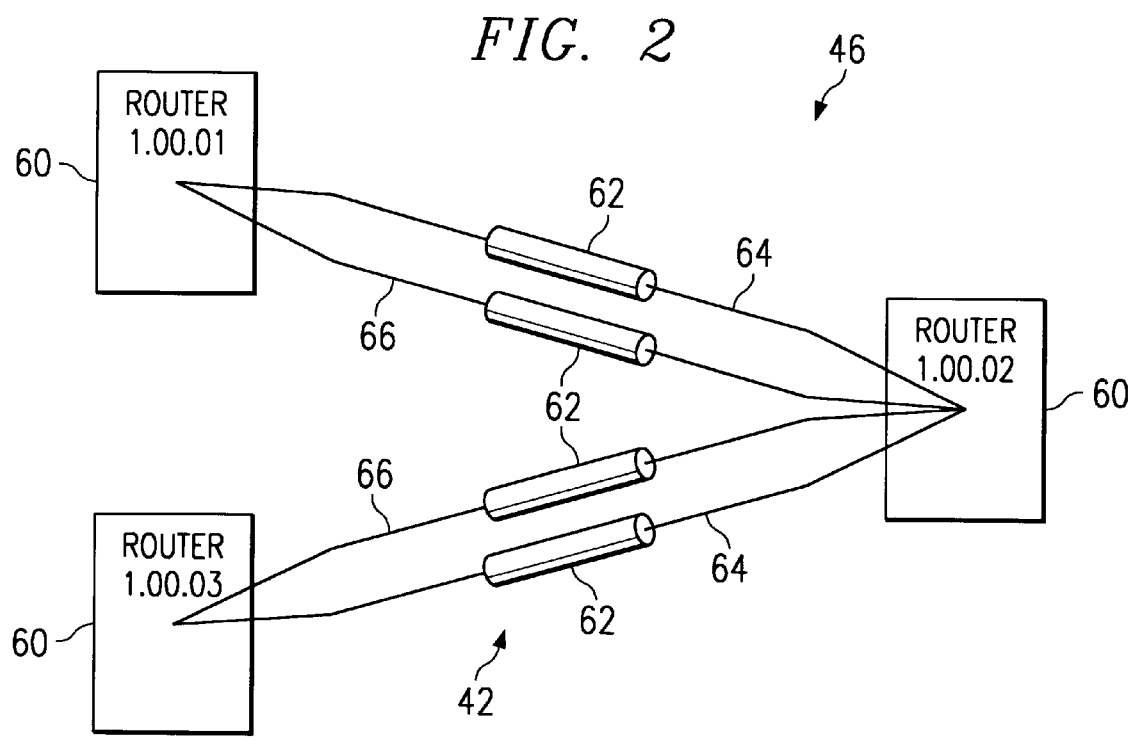
FIG. 2 is a schematic block diagram illustrating primary and secondary embedded channels for the management network of FIG. 1.

FIG. 2 illustrates details of the management network 46. As previously described, the management network 46 includes robust maintenance links 42 that provide communication between the client and management sites 12 and 16.

Referring to FIG. 2, the management network 46 includes a plurality of routers 60 connected by network trunks 62. Primary embedded channels 64 and secondary embedded channels 66 are defined in the network trunks 62. In one embodiment, the network trunks 62 are T1s and the embedded channels 64 and 66 are private virtual channels. The private virtual channels 64 and 66 provide what appears to be dedicated lines without the cost associated with such lines. The private virtual channels 64 and 66 follow a predefined path between routers 60 and other equipment of the management network 46. In accordance private virtual channel standards, data is transmitted in accordance with backward and forward congestion protocols.

The primary private virtual channel 64 carries management channel traffic between the customer and client sites 12 and 16 in normal operation. The secondary private virtual channel 66 carries the channel traffic between the customer and management sites 12 and 16 in the event of a fault condition on the primary embedded channel 64. Accordingly, communications, and thus management, of the customer premise equipment 20 is maintained even in the presence of a fault on a management link 42.

Figure 3:
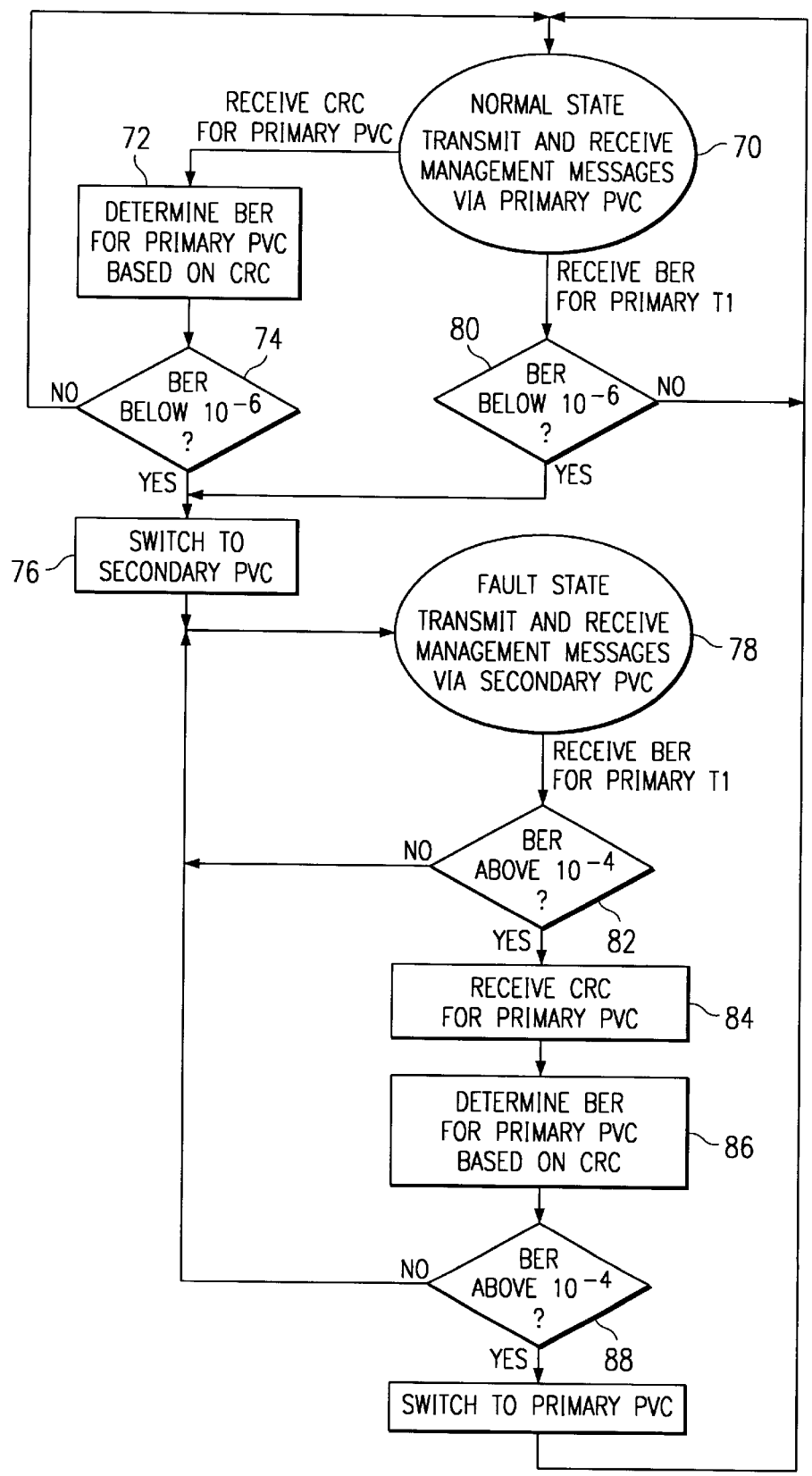
FIG. 3 is a flow diagram illustrating a method of automatic line protection switching between the primary and secondary embedded channels of the management network of FIG. 2.

FIG. 3 illustrates a method of automatic line protection switching between the primary and secondary private virtual channels 64 and 66 of the management network 46. The method is independently conducted by the routers 60 at each end of the primary and secondary private virtual channels. As a result, the routers 60 independently switch between the primary and secondary private virtual channels 64 and 66 in unison and without the communication of private virtual channel fault messages.

Referring to FIG. 3, in a normal state 70 traffic is transmitted and received between transmit and receive nodes via the primary private virtual channel 64. The node may be routers, switches, hooks, bridges or other equipment capable of selectively directing traffic in the management network 46. In the normal state 70, each node independently monitors a check sum value of the primary private virtual channel 64. When a check sum value for the primary private virtual channel 64 is received, state 70 leads to step 72. At step 72, the node determines a bit error rate (BER) for the primary private virtual channel 64 based on the check sum value for the channel 64. Next, at decisional step 74, the node determines if the bit error rate is below $10^{-6}$. If the bit error rate is not below $10^{-6}$, then the No branch of decisional step 74 returns to normal state 70. If the bit error rate is below $10^{-6}$, then a fault condition exists on the primary private virtual channel 64 and the Yes branch of decisional step 74 leads to step 76. At step 76, the node switches from the primary private virtual channel 64 to the secondary private virtual channel 66. Step 76 leads to fault state 78 in which traffic is transmitted and received via the secondary private virtual channel 66.

Returning to normal state 70, each node also independently monitors the bit error rate of the network trunk 62. The bit error rate may be independently determined by each node based on a check sum value or may be provided in accordance with trunk transmission protocol. In response to receiving the bit error rate of the network trunk 62, state 70 leads to decisional step 80. At decisional step 80, the node determines if the bit error rate for the network trunk 62 is below $10^{-6}$. If the bit error rate is not below $10^{-6}$, the No branch of decisional step 80 returns to normal state 70. If the bit error rate of the network trunk 62 is below $10^{-6}$, a fault condition exists on the network trunk 62 and the Yes branch of decisional step 80 leads to step 76. As previously described at step 76, the node switches from the primary private virtual channel 64 to the secondary private virtual channel 66. Next, at the fault state 78, traffic is transmitted and received via the secondary private virtual channel 66.

In the default state 78, each node continues to monitor the network trunk 62 and the primary private virtual channel 64 for a non fault condition. In response to receiving a bit error rate for the network trunk 62 carrying the primary private virtual channel 64, fault state 76 leads to decisional step 82. At decisional step 82, the node determines if the bit error rate for the network trunk 62 is above $10^{-4}$. If the bit error rate is not above $10^{-4}$, then a fault condition continues to exist within the network trunk 62 and the No branch of decisional step 82 returns to fault state 78. If the bit error rate of the network trunk 62 is above $10^{-4}$, then a non fault condition exits in the network trunk 62 and the Yes branch of decisional branch 82 leads to step 84.

At step 84, the node receives a check sum value for the primary private virtual channel 64. Proceeding to step 86, the node determines the bit error rate for the primary private virtual channel 64 based on the check sum value. Next, at step 88, the node determines if the bit error rate for the primary private virtual channel 64 is above $10^{-4}$. If the bit error rate for the primary private virtual channel 64 is not above $10^{-4}$, then a fault condition continues to exist in the primary private virtual channel 64 and the No branch of decisional step 88 returns to the fault state 78. If the bit error rate of the primary private virtual channel 64 is above $10^{-4}$, then a non fault condition exists in the primary private virtual channel 64 and the Yes branch of decisional step 88 leads to step 90. At step 90, the node switches from the secondary primary private virtual channel 66 to the primary private virtual channel 64. Step 90 leads to normal state 70 in which traffic is transmitted and received on the primary private virtual channel 64.

Thus, each node independently and in unison switches between the primary and secondary private virtual channels 64 and 66 in response to the same fault and non fault conditions. The fault and non fault conditions may be any suitable condition of the network trunk and/or private virtual or other embedded channel that can be obtained or determined by the nodes. In this way, automatic line protection switching is provided for private virtual channels independent of protection for network trunks.

Although the present invention has been described with several embodiments, various changes and modifications may be suggested to one skilled in the art. It is intended that the present invention encompass such changes and modifications as fall within the scope of the appended claims.

What is claimed is:

1. A communications system for remotely managing equipment, comprising:

a first remote device having a network address;

a second remote device having the same network address;

a management station operable to individually access the first remote device via a first link connecting the first remote device to the management station and to individually access the second remote device via a second, disparate link connecting the second remote device to the management station;

a switch including a first input connected to the first link and a second, disparate input connected to the second link; and the management station operable to access the first link via the first input and to access the second link via the second input.

2. The communications system of claim 1, wherein the network address is an Internet Protocol (IP) address.

3. The communications system of claim 1, wherein the first and second links each include an embedded channel.

4. The communications system of claim 1, wherein data is transmitted on the embedded channels in accordance with a backward and forward congestion protocol.

5. The communications system of claim 1, wherein the first and second links each include private virtual channels.

6. The communications system of claim 1, wherein the communications network includes a frame relay network.

7. A communications system for remotely managing equipment, comprising:

a first remote device having a network address;

a second remote device having the same network address;

a management station operable to individually access the first remote device via a first link connecting the first remote device to the management station and to individually access the second remote device via a second, disparate link connecting the second remote device to the management station;

the first link including a first input of a switch;

the second link including a second, disparate input of the switch;

the management station operable to access the first remote device based on an address associated with the first input of the switch; and the management station operable to access the second remote device based on a disparated address associated with the second input of the switch.

8. The communications system of claim 7, wherein the switch is a digital cross connect switch.

9. The communications system of claim 7, wherein the switch is a router operating statically.

10. The communications system of claim 1, further comprising:

a first memory for storing data downloaded from the first remote device;

a second memory for storing data downloaded from the second remote device; and the switch operable to direct data downloaded via the first input to the first memory and to direct data downloaded via the second input to the first memory.

11. The communications system of claim 10, further comprising a local area network connecting the switch to the management station, a first server including the first memory, and a second server including the second memory.

12. The communications system of claim 1, wherein the first and second remote devices are each customer premise equipment (CPE) and the network address accesses command and control functions of the customer premise equipment.

13. The communications system of claim 1, wherein the first and second remote devices are each customer premise equipment (CPE) and the network address accesses performance data for the customer premise equipment.

14. The communications system of claim 1, wherein the first and second remote devices are each customer premise equipment (CPE) having a network address for accessing command and control functions of the customer premise equipment and a disparate network address for accessing performance data for the customer premise equipment.

15. A method for remotely managing equipment having duplicate network address, comprising:

accessing with a management station a first remote device having a network address and connected to the management station via a first link;

accessing with the management station a second remote device having the same network address and connected to the management station via a second, disparate link;

the first link including a first input of a switch;

the second link including a second, disparate input of the switch;

accessing with the management station the first remote device based on an address associated with the first input of the switch; and accessing with the management station the second remote device based on a disparate address associated with the second input of the switch.

16. The method of claim 15, wherein the network address is an Internet Protocol (IP) address.

17. The method of claim 15, wherein the first and second links each include private virtual channels.

18. The method of claim 15, wherein the switch is a router operating statically.

* * * * *